US012719682B2

(12) United States Patent
Daniels-Couch et al.

(10) Patent No.: US 12,719,682 B2
(45) Date of Patent: Aug. 25, 2026

(54) METHOD FOR GENERATING NFT BASED TRAINING DATA

(71) Applicants: Meka Daniels-Couch, Greensburg, IN (US); Andrew Couch, Greensburg, IN (US); Scott C. Scheidt, Pooler, GA (US); Inayat Ullah, Sheffield (GB)

(72) Inventors: Meka Daniels-Couch, Greensburg, IN (US); Andrew Couch, Greensburg, IN (US); Scott C. Scheidt, Pooler, GA (US); Inayat Ullah, Sheffield (GB)

( * ) Notice: Subject to any disclaimer, the term of this patent is extended or adjusted under 35 U.S.C. 154(b) by 202 days.

(21) Appl. No.: 18/782,822

(22) Filed: Jul. 24, 2024

(65) Prior Publication Data

US 2026/0067082 A1 Mar. 5, 2026

Related U.S. Application Data

(60) Provisional application No. 63/515,458, filed on Jul. 25, 2023.

(51) Int. Cl.

*H04L 9/32* (2006.01)
*H04L 9/00* (2022.01)
*H04L 9/08* (2006.01)

(52) U.S. Cl.

CPC .......... *H04L 9/3213* (2013.01); *H04L 9/0852* (2013.01); *H04L 9/50* (2022.05)

(58) Field of Classification Search

CPC ....... H04L 9/50; H04L 9/3213; H04L 9/0852; H04L 63/0807; H04L 67/104

See application file for complete search history.

(56) References Cited

U.S. PATENT DOCUMENTS

| | | | | |
|---|---|---|---|---|
| 11,641,280 | B1 * | 5/2023 | Chapman | H04L 9/3234 713/172 |
| 12,014,363 | B2 * | 6/2024 | Haddad | G06Q 20/38215 |
| 12,489,637 | B2 * | 12/2025 | Meyers | H04L 9/0869 |
| 12,524,506 | B2 * | 1/2026 | Welch | G06F 21/10 |
| 2022/0069996 | A1 * | 3/2022 | Xue | H04L 9/3297 |
| 2023/0318829 | A1 * | 10/2023 | Sim | H04L 9/3093 |
| 2024/0430114 | A1 * | 12/2024 | Jakobsson | G06F 21/44 |

OTHER PUBLICATIONS

Wang, Qin, et al. "Non-fungible token (NFT): Overview, evaluation, opportunities and challenges." arXiv preprint arXiv:2105.07447 (2021). (Year: 2021).*

* cited by examiner

*Primary Examiner* — Lizbeth Torres-Diaz

(57) ABSTRACT

A system and method that integrates quantum algorithms into the Hyperledger blockchain platform, combining it with non-fungible tokens (NFTs) as data sources for generative artificial intelligence (AI) within the Internet of Things (IoT) ecosystem. The system can also use a public blockchain network for secure and authenticated transfer of NFT ownership and establishes a robust proof of ownership mechanism for AI models. This proof of ownership mechanism ensures the verifiability, traceability, and protection of ownership rights over the AI models represented by NFTs. By integrating quantum computing capabilities, NFTs, Gen AI, IoT integration, public blockchain transfer, and proof of ownership, the system enables enhanced security, authenticity, unique content generation, seamless NFT ownership transfer, and intellectual property protection within the Hyperledger and IoT domains.

20 Claims, 7 Drawing Sheets

```
QACI-NFT-Encoding:
  version: 4
  baseLayer:
    timestamp: <Unix timestamp>
    deviceId: <Unique IoT device identifier>
    quantumDataHash: <Quantum-resistant hash of the encodedData>
    encodedData:
      quantumCompressionAlgorithm: <Quantum-inspired compression algorithm>
      quantumEncoding: <Quantum encoding method>
      data: <Quantum-compressed and encoded IoT data>
    quantumWeightedData:
      weightingAlgorithm: <Quantum-inspired algorithm for weighting data>
      dataSourceType: <Single device or Multiple devices>
      dataPoolSize: <Number of data points or devices (1 for single device)>
      temporalRange: <Time range of data considered>
      weightedDataHash: <Quantum-resistant hash of the weighted data>
      confidenceScore: <Measure of confidence in the weighted data>
  nftMetadata:
    tokenId: <Quantum-generated unique NFT identifier>
    owner: <Current owner's quantum-resistant address>
    originChain: <Blockchain where NFT was originally minted>
    crossChainHistory: [<List of blockchains this NFT has been on>]
  quantumAdaptiveLayer:
    quantumMLModel: <Identifier for the quantum ML model used>
    predictionInterval: <Time interval for quantum-enhanced predictions>
    quantumConfidenceScore: <Quantum-derived confidence in the ML predictions>
  quantumBayesianLayer:
    quantumPriorDistributions: <Quantum representation of prior probability distributions>
    quantumPosteriorDistributions: <Quantum representation of updated posterior distributions>
    quantumEvidenceStrength: <Quantum measure of how much new data has affected priors>
  quantumCausalLayer:
    quantumCausalGraph: <Quantum-encoded representation of the causal graph>
    quantumInterventions: [<List of quantum interventions applied>]
    quantumCounterfactuals: [<List of quantum counterfactual scenarios considered>]
  quantumLLMLayer:
    quantumModelVersion: <Version of the quantum-enhanced LLM used>
    quantumContextWindow: <Quantum-encoded relevant context provided to the LLM>
    quantumGeneratedInsights: <Quantum LLM-generated insights or explanations>
    quantumQueryHistory: [<List of recent queries answered by the quantum LLM>]
  quantumCrossChainCompatibility:
    quantumDataFormat: <Quantum-resistant common data format for cross-chain transfers>
    quantumConversionMappings: <Quantum-encoded mappings for data fields across blockchain standards>
  quantumSignature: <Quantum-resistant digital signature of the entire structure>
  quantumEntanglementProof: <Proof of quantum entanglement with IoT device>
```

Fig. 7

METHOD FOR GENERATING NFT BASED TRAINING DATA

CROSS-REFERENCE TO RELATED APPLICATIONS

This application claims priority from a U.S. Provisional Ser. No. 63/515,458, filed on Jul. 25, 2023, which is incorporated herein by reference in its entirety.

FIELD OF INVENTION

The present invention relates to a system and method for encoding IoT data for NFTs, and more particularly, the present invention relates to a system and method for integrating quantum algorithms into a Hyperledger blockchain platform, combining it with non-fungible tokens (NFTs) as data sources for generative artificial intelligence (AI) within the Internet of Things (IoT) ecosystem.

BACKGROUND

In recent years, several transformative technologies have gained significant attention in the fields of technology, finance, and innovation. Hyperledger, as a widely adopted blockchain platform, has revolutionized the way transactions and data are recorded, verified, and shared in a secure and decentralized manner. The distributed ledger technology (DLT) has found applications in various industries, including finance, supply chain management, healthcare, and more.

At the same time, other technologies have emerged as powerful tools for enhancing security, authenticity, and efficiency in different domains. Quantum computing has shown immense potential in solving complex problems and performing computations exponentially faster than classical computers. Non-fungible tokens (NFTs) have revolutionized digital asset ownership and provenance, securely enabling the representation and transfer of unique digital assets. Generative artificial intelligence (AI) techniques have demonstrated the ability to produce novel and creative outputs based on learned patterns and models. The Internet of Things (IoT) has connected billions of devices and sensors, enabling the collection and exchange of vast amounts of data for various applications. Public blockchain networks have provided transparent and decentralized platforms for secure asset exchange and collaboration.

Thus, a need is appreciated for a system and method that can exploit the functionalities of such emerging domains.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to integrating transformative technologies to create new opportunities for innovation, security, and creativity.

In one aspect, disclosed are a system and method that integrate Hyperledger with quantum computing, NFTs, generative AI, IoT, public blockchain networks, and intellectual property protection. This integration enables a platform for developing secure, creative, and decentralized applications that offer enhanced security, authenticity, unique content generation, seamless asset ownership transfer, and intellectual property protection. Industries ranging from finance and supply chain management to healthcare and entertainment can leverage these technologies to streamline processes, foster collaboration, and drive innovation in various applications.

In one aspect, disclosed is a platform for developing secure, creative, and decentralized applications that offer enhanced security, authenticity, unique content generation, seamless asset ownership transfer, and intellectual property protection.

In one aspect, disclosed is a platform having features of Hyperledger, quantum computing, NFTs, generative AI, IoT, and public blockchain networks to open new possibilities for secure, creative, and decentralized applications. By harnessing the power of these transformative technologies, industries can benefit from enhanced security, improved efficiency, and novel opportunities for innovation and collaboration.

The present invention introduces a comprehensive system and method integrating quantum algorithms into Hyperledger for IoT-based generative AI. It leverages NFTs as data sources, incorporates quantum-inspired algorithms, and utilizes public blockchain networks for secure NFT transfer. Additionally, the invention establishes a robust proof of ownership mechanism for AI models represented by NFTs, enabling intellectual property protection within the Hyperledger and IoT ecosystems.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

FIG. 7 shows a screen illustrating Quantum-Enhanced Adaptive NFT for IoT data, according to an exemplary embodiment of the present invention.

DETAILED DESCRIPTION

Figure 1:
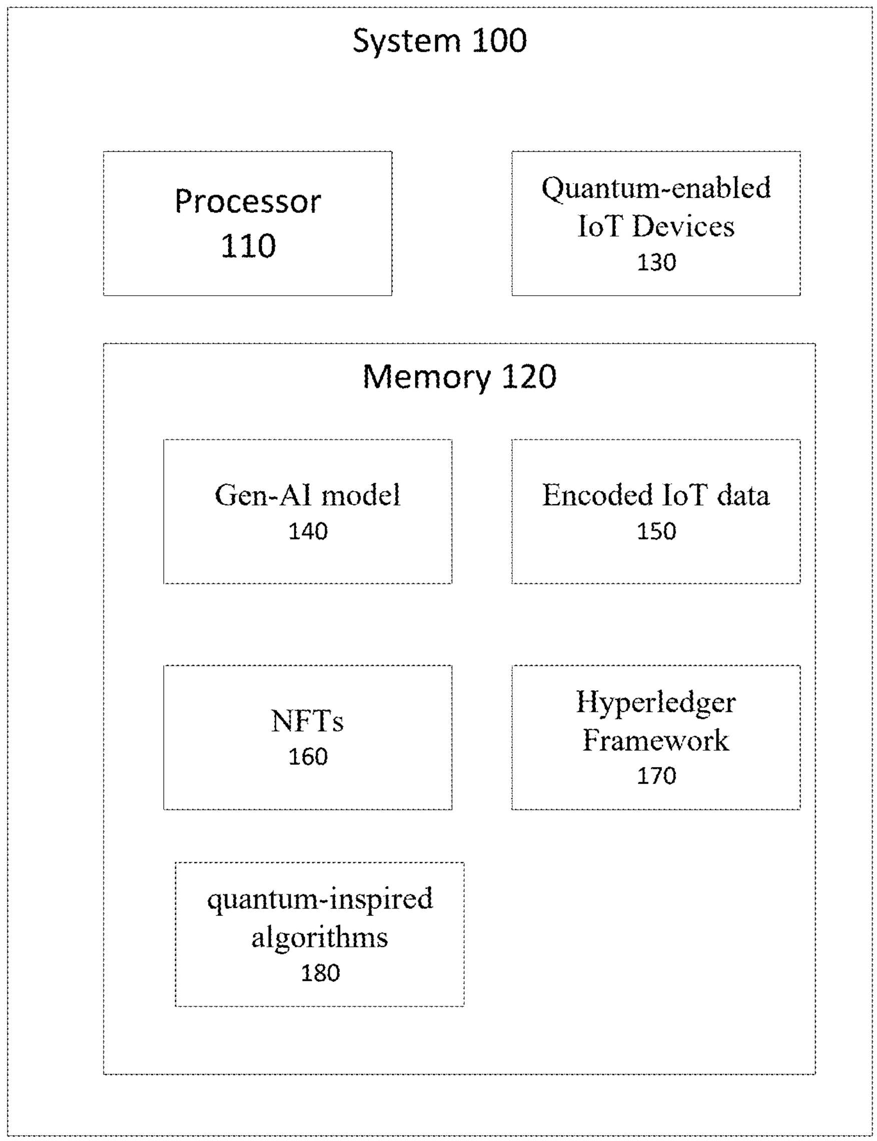
FIG. 1 is a block diagram showing the architecture of the system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The described invention pertains to a platform, a comprehensive system, and a method that leverages quantum computing, NFT-based generative AI, and public blockchain technology to enhance the security, authenticity, content generation, and ownership transfer within the Internet of Things (IoT) environment. By integrating quantum-enabled IoT devices, NFT-encoded data sources, quantum-inspired algorithms, and the Hyperledger framework, the invention revolutionizes the IoT landscape by introducing novel features and capabilities.

The Invention Encompasses the Following Components and Functionalities

Quantum-enabled IoT Devices: IoT devices can be equipped with quantum computing capabilities, enabling complex computations, and leveraging quantum algorithms within the IoT ecosystem. This integration empowers IoT devices with enhanced processing power, enabling advanced data analysis, secure interactions, and efficient resource utilization.

NFT-based Generative AI: Generative AI models are developed within the Hyperledger framework, utilizing NFTs as unique and authenticated data sources for content generation in the IoT context.

Leveraging the properties of quantum systems and quantum-inspired algorithms, the generative AI models produce highly unique and original outputs, tailored specifically for IoT applications.

Quantum-enabled Smart Contracts: The invention integrates quantum operations and computations into smart contracts within the Hyperledger framework, specifically designed for IoT applications. These smart contracts facilitate secure transactions, privacy-preserving data analysis, quantum key distribution, and quantum secure multi-party computation. The inclusion of quantum capabilities enhances the security, efficiency, and privacy aspects of IoT systems.

IoT Integration and Communication: The invention seamlessly integrates IoT devices, Hyperledger, generative AI models, and quantum capabilities within the IoT ecosystem. This integration allows for efficient and secure IoT data processing, content generation, and transfer. IoT devices communicate and collaborate, leveraging the power of quantum computing and the Hyperledger infrastructure.

Public Blockchain Transfer: To ensure a secure and authenticated transfer of ownership, the invention employs a public blockchain network. NFTs stored on the Hyperledger network are securely transferred to other parties within the IoT ecosystem using the public blockchain. This approach ensures transparency, immutability, and decentralized asset exchange in the IoT domain while maintaining the integrity and authenticity of the transferred NFTs.

Proof of Ownership: The invention establishes a robust proof of ownership mechanism for AI models using NFTs within the Hyperledger network. This mechanism enables verification, traceability, and protection of ownership rights, fostering trust and enabling fair licensing, monetization, and collaboration among stakeholders.

Advantages and Novelty

Enhanced Security and Authenticity: The integration of quantum algorithms, smart contracts, public blockchain transfer, and proof of ownership ensures enhanced security, authenticity, and verifiability in transactions, NFT ownership, and AI model ownership within the Hyperledger and IoT ecosystems.

Unique Content Generation: The combination of generative AI, quantum-inspired algorithms, IoT data, and NFTs enables the creation of highly unique and original content tailored for IoT applications. This provides a novel and creative edge to the generated content, promoting innovation and differentiation.

Seamless IoT Integration: The invention seamlessly integrates quantum-enabled IoT devices, Hyperledger, generative AI models, quantum capabilities, and NFT transfer within the IoT ecosystem. This integration enables efficient and secure IoT data processing, content generation, and ownership transfer, enhancing the overall functionality and effectiveness of IoT systems.

Intellectual Property Protection: The invention provides robust proof of ownership mechanism for AI models represented by NFTs. This mechanism enhances intellectual property protection, fostering fair licensing, monetization, collaboration, and trust among stakeholders.

It enables the secure exchange and protection of valuable AI models within the Hyperledger and IoT domains.

Industrial Applicability

The disclosed invention finds application in diverse IoT domains, including but not limited to smart homes, industrial automation, healthcare, and environmental monitoring. By integrating quantum algorithms, NFTs, generative AI, IoT integration, public blockchain transfer, and proof of ownership within the Hyperledger framework, it enables enhanced security, authenticity, unique content generation, seamless NFT ownership transfer, and intellectual property protection. The invention empowers IoT systems with advanced capabilities, driving innovation, efficiency, and trust in the IoT industry.

In summary, the present patent application introduces a comprehensive system and method that integrates quantum computing, NFT-based generative AI, and public blockchain technology within IoT systems.

The invention revolutionizes the IoT landscape by enhancing security, authenticity, content generation, and ownership transfer. By leveraging quantum-enabled devices, Hyperledger infrastructure, and NFT-encoded data, the invention enables efficient and secure IoT operations, fosters innovation, and ensures intellectual property protection.

Initialize IoT Devices with Quantum Computing Feature Utilizing Resource Sharing Between IoT Devices Installation of Quantum Processors: The IoT devices are equipped with specialized software frameworks and libraries that simulate or emulate quantum processors on non-quantum hardware. These software frameworks enable the execution of quantum-inspired algorithms and simulations.

Resource Sharing Implementation: Resource sharing techniques are implemented to enable collaboration and efficient utilization of quantum computing resources across multiple IoT devices. This can be achieved through the establishment of a network infrastructure and protocols that facilitate the distribution and coordination of quantum computing tasks.

Optional Network Traffic API Integration: Should a use case requirement be presented for Network Traffic Analysis, Cybersecurity monitoring tools that can report on the status of the IoT device's network traffic security posture will be connected by an associated Application Programming Interface (API) integrated at this point to identify any network traffic anomalies associated with the communication between IoT devices before the quantum computing feature enablement and before establishing a connection with the distributed ledger Task Allocation and Load Balancing: A mechanism is put in place to allocate quantum computing tasks among the IoT devices in a balanced manner. This involves considering factors such as device capabilities, availability, and computational load to optimize resource utilization and ensure efficient processing.

In the quantum-enabled Hyperledger system with IoT devices, task allocation, and load balancing are essential for optimizing resource utilization and ensuring efficient processing. The following approach can be taken to achieve this:

Task Allocation Algorithm: A sophisticated task allocation algorithm (Smart Contract) is implemented within the system to distribute quantum computing tasks among the IoT devices. This algorithm considers factors such as device capabilities, availability, computational load, and other relevant metrics specific to the quantum-enabled tasks.

Device Capability Assessment: Each IoT device's capabilities are assessed based on factors such as processing power, memory capacity, and quantum computing features. This assessment provides valuable insights into the suitability of each device for executing quantum tasks.

Computational Load Monitoring: The system continuously monitors the computational load of each IoT device to determine its current capacity and availability. This information serves as input for the task allocation algorithm, helping to balance the workload across devices.

Load Balancing Strategy: The task allocation algorithm employs a load balancing strategy that aims to evenly distribute quantum computing tasks among the IoT devices. This strategy optimizes resource utilization, prevents overloading of any device, and ensures efficient processing.

Task Assignment and Tracking: Based on the load-balancing strategy, the system assigns quantum computing tasks to the IoT devices. The assignments are tracked and recorded to maintain transparency and accountability within the system.

Dynamic Load Adjustment: The task allocation mechanism dynamically adjusts the task distribution based on changes in device availability and computational load. If a device becomes unavailable or its load changes, the system redistributes tasks to maintain a balanced allocation of resources.

By implementing this task allocation and load balancing mechanism, the quantum-enabled Hyperledger system ensures that quantum computing tasks are allocated among the IoT devices in a balanced manner. This optimization maximizes resource utilization, enhances processing efficiency, and contributes to the overall effectiveness of the system.

Distributed Computation: The IoT devices collaboratively leverage their quantum computing capabilities by dividing complex computational tasks into smaller sub-tasks that can be executed in parallel across multiple devices. This distributed computation approach enhances the overall processing power and capabilities of the IoT network, enabling faster and more efficient execution of quantum-inspired algorithms.

Figure 3:
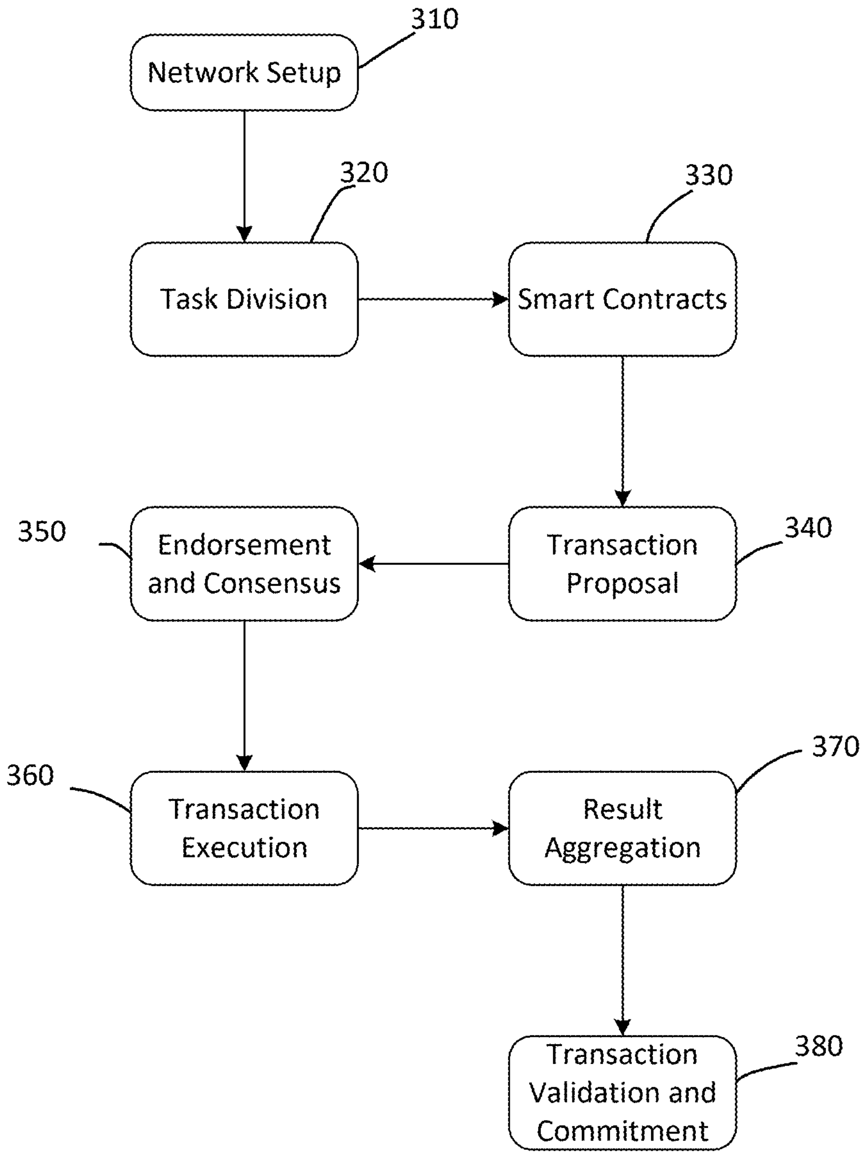
FIG. 3 Illustrates a Distributed Computation flow chart, according to an exemplary embodiment of the present invention.

FIG. 3 is Described Below

Network Setup (310): A Hyperledger Fabric network is established, consisting of multiple IoT devices that participate as peers in the network. These IoT devices collectively form a distributed network for executing quantum-inspired algorithms.

Task Division (320): Complex computational tasks, such as quantum-inspired algorithms, are divided into smaller sub-tasks or transactions that can be processed in parallel. These sub-tasks are distributed among the IoT devices participating in the network.

Smart Contracts (330): Smart contracts, implemented as chain code in Hyperledger Fabric, define the business logic for executing the distributed computations. The smart contracts specify the computational tasks, data inputs, and instructions for each IoT device to execute.

Transaction Proposal (340): Each IoT device prepares a transaction proposal that includes the sub-task it will execute, along with any required data inputs. The transaction proposal is endorsed by other participating IoT devices in the network.

Endorsement and Consensus (350): The endorsed transaction proposals are submitted to the ordering service within the Hyperledger Fabric network. The ordering service ensures the agreed-upon order of transactions and generates blocks for the subsequent endorsement process.

Transaction Execution (360): Each IoT device independently executes its assigned sub-task according to the instructions specified in the smart contract. The IoT devices leverage their quantum computing capabilities to perform the quantum-inspired algorithms efficiently.

Result Aggregation (370): Once the sub-tasks are executed, the IoT devices aggregate their results. This can be done through a consensus mechanism to ensure the integrity and accuracy of the computed results.

Transaction Validation and Commitment (380): The aggregated results are then validated by other participating IoT devices in the network. Upon validation, the results are committed to the blockchain, making them immutable and tamper-proof.

By leveraging Hyperledger Fabric's decentralized and consensus-driven architecture, IoT devices can collaboratively execute quantum-inspired algorithms through distributed computation. This approach enhances the overall processing power and capabilities of the IoT network, enabling faster and more efficient execution of these algorithms. The transparent and verifiable nature of the Hyperledger Fabric blockchain ensures the integrity and trustworthiness of the distributed computations performed by IoT devices.

Figure 5:
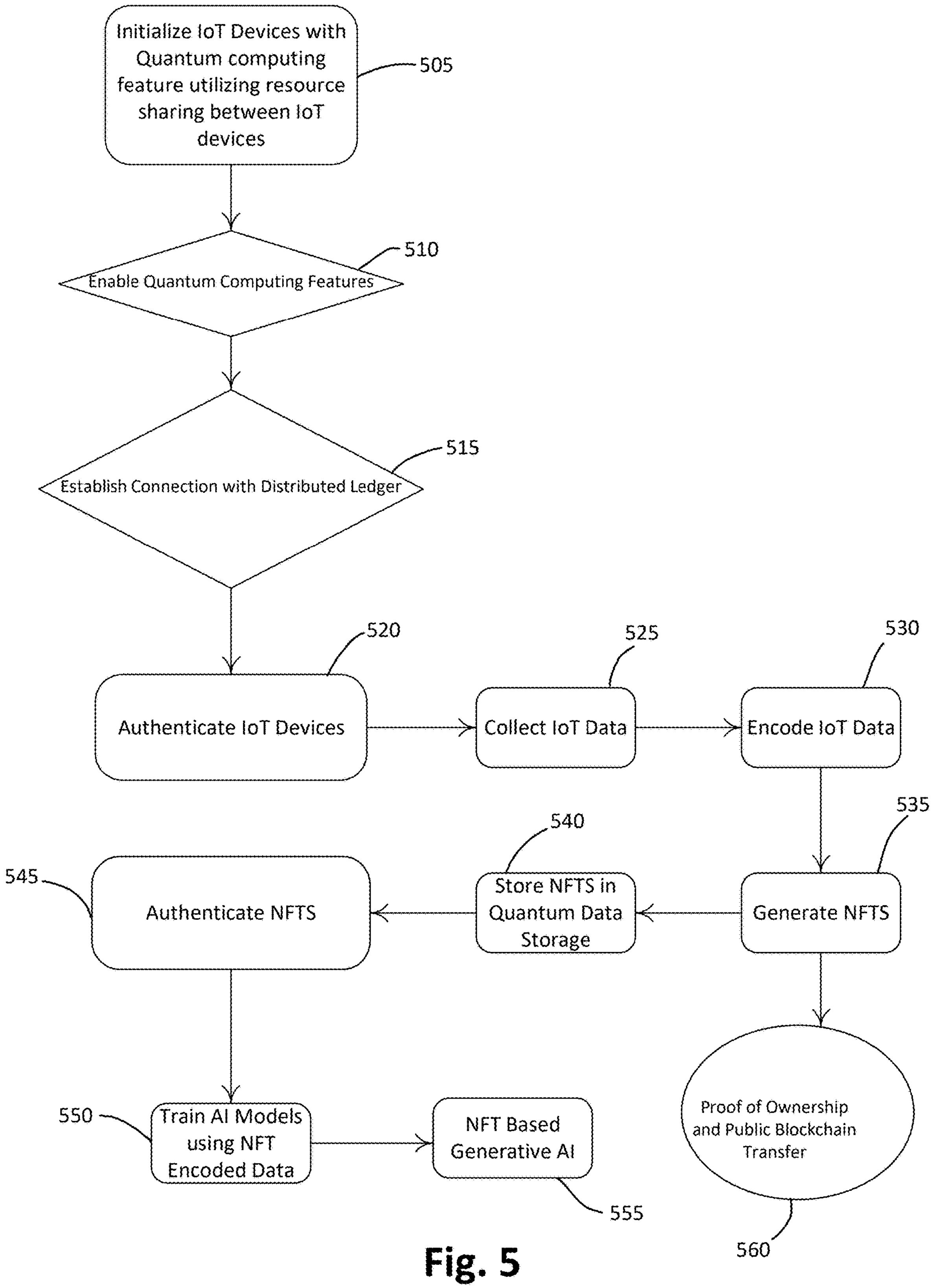
FIG. 5 Illustrates the transfer NFT Process, according to an exemplary embodiment of the present invention.

Referring to FIG. 5, which illustrates the transfer NFT Process. First, the IoT devices can be initialized, at step 505, and then quantum computing features can be enabled, at 510, further described below.

Resource Management and Synchronization on ARM Architecture:

Task Scheduling: A resource management system is implemented to schedule quantum computing tasks on IoT devices based on their availability, capabilities, and workload. Task scheduling algorithms and policies are designed to efficiently allocate quantum computing resources and balance the computational load among the IoT devices.

Resource Allocation: The resource management system assigns quantum computing resources to IoT devices for executing their allocated tasks. This involves allocating the necessary memory, processing power, and other hardware resources required for running the quantum algorithms on ARM-based devices.

Data Sharing: Protocols and mechanisms are implemented to facilitate the sharing of data between IoT devices during the execution of quantum computing tasks. This enables the exchange of intermediate results, input data, or other relevant information required for the collaborative execution of quantum algorithms. Data sharing can be performed through secure communication channels and data transfer protocol MQTT suitable for ARM architecture.

Result Aggregation: Once the IoT devices complete their respective quantum computing tasks, the resource management system collects and aggregates the results. This involves combining the individual outputs from each IoT device to generate a consolidated result. Aggregation techniques such as averaging, voting, or weighted averaging can be employed to derive the result while maintaining the integrity and consistency of the computations.

Synchronization and Coordination: In this system, a synchronization protocol such as the Advanced Message Queuing Protocol (AMQP) can be employed to ensure proper coordination and synchronization of quantum computing resources among IoT devices.

Resource Release: After the completion of quantum computing tasks, the allocated resources are released and made available for other tasks. The resource management system handles the efficient release and reallocation of resources based on the availability and demand within the IoT network.

By implementing resource management and synchronization mechanisms on ARM architecture, the allocation, execution, and release of quantum computing resources among IoT devices can be efficiently coordinated. This ensures proper resource utilization, load balancing, and synchronization, leading to improved performance, integrity, and consistency of quantum computing tasks on ARM-based IoT devices.

Performance Optimization: Techniques such as caching, data compression, and parallel processing are employed to optimize the performance and efficiency of quantum computing tasks on non-quantum devices. These techniques help mitigate the limitations of non-quantum hardware and maximize the utilization of available resources.

Enabling Quantum Computing Features (510): Quantum Computing features are enabled on IoT devices, including the activation and configuration of quantum gate emulation, quantum simulation software, and quantum algorithms. This enables the devices to perform quantum computations, taking advantage of quantum principles such as superposition, entanglement, and interference.

To enable quantum computing features on IoT devices, several steps are taken, including the activation and configuration of quantum gate emulation, quantum simulation software, and quantum algorithms. This process allows the IoT devices to harness the power of quantum principles, such as superposition, entanglement, and interference, to perform quantum computations.

Activation of Quantum Gate Emulation:

The IoT devices are equipped with specialized software frameworks and libraries that simulate or emulate quantum gates on non-quantum hardware. These quantum gates serve as the fundamental building blocks for performing quantum computations. By activating the quantum gate emulation, the IoT devices gain the ability to execute quantum gate operations, such as single-qubit rotations and two-qubit entangling operations.

Configuration of Quantum Simulation Software:

Quantum simulation software is installed and configured on the IoT devices to provide an environment for simulating and executing quantum algorithms. This software allows the devices to model and simulate the behavior of quantum systems, including the interactions between qubits, the effects of quantum gates, and the outcomes of quantum measurements. Through the configuration of the quantum simulation software, the IoT devices can effectively simulate and execute quantum computations.

Integration of Quantum Algorithms:

Quantum algorithms, specifically designed to leverage the capabilities of quantum computing, are integrated into IoT devices. These algorithms exploit the principles of superposition and entanglement to perform computations that are intractable for classical computers. By integrating quantum algorithms into IoT devices, they gain the ability to execute complex computations and solve problems more efficiently than classical algorithms.

Leveraging Quantum Principles: The enabled quantum computing features on IoT devices allow them to take advantage of quantum principles such as superposition, entanglement, and interference. Superposition enables the devices to process multiple states simultaneously, exponentially expanding the computational possibilities. Entanglement allows the devices to create correlations between qubits, leading to enhanced computational power. Interference enables the devices to manipulate and control the outcomes of quantum measurements, facilitating the extraction of meaningful information from quantum systems.

By enabling quantum computing features, including quantum gate emulation, quantum simulation software, and quantum algorithms, the IoT devices are empowered to perform quantum computations. This capability allows them to leverage the unique properties of quantum systems, such as superposition, entanglement, and interference, to solve complex problems and execute computations more efficiently than classical devices.

Enable Quantum Computing Features on Arm Architecture (Quantum Gate Emulation Techniques):

To enable quantum computing features on IoT devices based on the ARM architecture, specialized software frameworks, and libraries are utilized to simulate or emulate quantum gates on non-quantum hardware. These quantum gates serve as the fundamental building blocks for performing quantum computations. Various emulation techniques can be employed, specifically tailored for ARM architecture, including:

ARM-specific Gate Emulation: The software frameworks and libraries implement quantum gates using ARM-specific instructions and optimizations. By leveraging the unique features of the ARM architecture, such as SIMD (Single Instruction, Multiple Data) instructions and NEON technology, quantum gate operations can be efficiently emulated on ARM-based IoT devices.

Circuit Emulation on ARM: Quantum gates can be emulated through the construction and execution of quantum circuits using ARM-specific instructions. The software frameworks provide ARM-optimized instructions or APIs that allow the construction and manipulation of quantum circuits on ARM architecture, enabling efficient emulation of quantum gate operations.

Quantum Simulation Software for Arm Architecture:

Quantum simulation software for ARM architecture is installed and configured on IoT devices to provide an environment for simulating and executing quantum algorithms. This software is specifically designed to leverage the capabilities of ARM-based IoT devices, including:

ARM-optimized Qubit Representation: The software represents qubits, the basic units of quantum information, and their quantum states in a format optimized for ARM architecture. It leverages ARM-specific data structures and optimizations to efficiently manipulate and track qubit states during the execution of quantum algorithms.

ARM-optimized Gate Operations: The simulation software provides a library of quantum gates that are optimized for ARM architecture. These gates include single-qubit gates (e.g., Pauli gates, Hadamard gate) and two-qubit gates (e.g., CNOT gate) implemented using ARM-specific instructions. The software executes the gate operations using ARM-optimized instructions, simulating the effects of quantum gate operations efficiently on ARM-based IoT devices.

Quantum Circuit Construction on ARM: The simulation software enables the construction and execution of quantum circuits using ARM-specific instructions or APIs. It allows the arrangement of quantum gates in a sequential manner to form a circuit, leveraging ARM architecture's features for efficient flow of quantum operations.

Measurement Simulation on ARM: The software simulates the outcomes of quantum measurements performed on qubits using ARM-optimized techniques. It generates measurement results based on the probabilities defined by the quantum state of the qubits, efficiently simulating measurement-based quantum computations on ARM-based IoT devices.

Hardware and Software Modifications for ARM Architecture:

Enabling quantum computing on ARM-based IoT devices may require specific hardware and software modifications tailored for ARM architecture. These modifications can include:

ARM-based Quantum Processors: IoT devices based on ARM architecture may require the integration of specialized quantum processors or co-processors designed for ARM architecture. These processors provide the necessary computational capabilities for executing quantum algorithms efficiently on ARM-based IoT devices.

ARM-optimized Quantum Software Frameworks: The IoT devices need to be equipped with software frameworks specifically optimized for quantum computing on ARM architecture. These frameworks provide ARM-specific tools, libraries, and APIs for quantum gate emulation, quantum circuit simulation, and quantum algorithm execution on ARM-based IoT devices.

Resource Management and Synchronization on ARM: To effectively utilize quantum computing resources on ARM-based IoT devices, resource management and synchronization mechanisms are implemented, considering the specific features and capabilities of ARM architecture. These mechanisms optimize the allocation and usage of hardware resources such as memory, processing power, and storage to support efficient quantum computations on ARM-based IoT devices.

Quantum Algorithm Integration on ARM: The IoT devices based on ARM architecture are equipped with the capability to integrate and execute quantum algorithms optimized for ARM architecture. This involves modifications to the software stack to accommodate the execution of ARM-optimized\quantum-inspired algorithms and the utilization of quantum computing features efficiently on ARM-based IoT devices.

By implementing these specific quantum computing features tailored for ARM architecture, including ARM-specific quantum gate emulation techniques, simulation software, and necessary hardware or software modifications, IoT devices based on ARM architecture gain the ability to perform quantum computations efficiently. This allows them to leverage the unique properties of quantum systems, such as superposition, entanglement, and interference, to solve complex problems and execute computations more efficiently than classical devices.

Establish a Connection with Distributed Ledger (515): IoT devices establish a secure and reliable connection with the distributed ledger, such as the Hyperledger blockchain platform. This connection ensures seamless communication and interaction between the IoT devices and the ledger, facilitating the exchange of data, transactions, and smart contracts.

Authenticate IoT Devices (520): The IoT devices undergo an authentication process to ensure their legitimacy and integrity within the network. This authentication can involve cryptographic protocols, digital signatures, or other security mechanisms to verify the identity and trustworthiness of the devices. By authenticating the devices, the network can prevent unauthorized access, data tampering, and malicious activities.

Collect IoT Data (525): The IoT devices gather data from various sensors and sources within their environment. This data can include sensor readings, environmental parameters, user inputs, or any other relevant information. The collected data serves as the basis for subsequent processing, analysis, and generation of insights.

Encode IoT Data (530): The collected IoT data is encoded using appropriate techniques to represent it in a format suitable for NFTs. This encoding process ensures that the data can be securely and efficiently stored as NFTs on the distributed ledger. The encoding may involve data compression, encryption, or other transformations to maintain the integrity and privacy of the IoT data.

Generate NFTs (535)—Proof of Ownership and Public Blockchain Transfer (560): NFTs are generated for the authenticated IoT data, serving as proof of ownership, and facilitating their transfer on the public blockchain. These NFTs contain unique identifiers, cryptographic signatures, and ownership information, ensuring the authenticity, traceability, and transferability of the IoT data represented by the NFTs. The public blockchain network facilitates the secure and transparent transfer of NFT ownership among parties within the IoT ecosystem.

Store NFTs in Hyperledger Storage (540): The authenticated NFTs are securely stored in the Hyperledger storage system. Hyperledger provides a distributed ledger infrastructure that ensures the integrity, privacy, and longevity of the NFTs representing the IoT data. The Hyperledger storage system employs cryptographic techniques, consensus algorithms, and replication mechanisms to maintain a tamper-proof and immutable record of the NFTs. This ensures the authenticity and availability of the NFTs, allowing for secure ownership transfer, traceability, and efficient data management within the IoT ecosystem.

Authenticate NFTs (545): The NFTs representing the encoded IoT data are authenticated to verify their integrity and provenance. This authentication process ensures that the NFTs have not been tampered with and that they are valid representations of the original IoT data. Techniques such as digital signatures, cryptographic hashes, or blockchain verification mechanisms can be employed to authenticate the NFTs.

Train AI Models using NFT Encoded Data (550): AI models, such as generative AI models, are trained using the NFT-encoded IoT data. The encoded data serves as the training dataset for the AI models, enabling them to learn patterns, generate insights, or produce creative outputs. The AI models leverage quantum-inspired algorithms and principles, taking advantage of the unique properties of quantum systems to enhance the training process.

NFT-Based Generative AI (555): The trained AI models, incorporating quantum-inspired algorithms, form the basis of NFT-based generative AI. These AI models utilize the NFT-encoded IoT data to generate unique and original content tailored to specific IoT applications. The generative AI process leverages the quantum-inspired techniques learned during training to produce highly creative and customized outputs, enhancing the value and novelty of the generated content.

Generative AI plays a pivotal role in enhancing the analysis and utilization of IoT outputs. The system's quantum-inspired LLM layer processes complex, multi-dimensional data from various IoT devices and generates human-readable insights, predictive analyses, and actionable recommendations. For instance, the Gen AI component in healthcare applications synthesizes patient data from multiple IoT sensors (heart rate monitors, glucose sensors, and activity trackers) to produce comprehensive health reports, predict potential health risks, and suggest personalized treatment plans. These AI-generated outputs are not mere summaries of data, but intelligent, context-aware interpretations that can significantly aid healthcare professionals in making more informed decisions.

Moreover, the Gen AI capabilities extend beyond individual patient care to broader applications. By analyzing anonymized, aggregated data across the decentralized network, the system can generate population health trends, identify emerging health patterns, and even assist in drug discovery by suggesting potential correlations between treatments and outcomes. The quantum-inspired algorithms enable the Gen AI to handle complex, non-linear relationships in the data, potentially uncovering insights that traditional analysis might overlook. This advanced analytical capability, combined with the system's efficient resource sharing and sustainable computation model, makes it a powerful tool for generating actionable intelligence from vast amounts of IoT data across various sectors, from healthcare to smart cities and industrial applications.

Collect IoT Data:

Sensor Data Acquisition: IoT devices are equipped with various sensors that collect data from the physical environment. These sensors can include temperature sensors, humidity sensors, motion sensors, cameras, or any other type of sensor relevant to the specific IoT application.

Data Processing and Aggregation: The collected sensor data is processed and aggregated within the ARM IoT devices. This may involve filtering, cleaning, and transforming the raw data to make it suitable for further analysis and utilization.

Data Contextualization: The processed data is contextualized by adding additional metadata such as timestamps, device identifiers, geographical location, or any other relevant contextual information. This enhances the understanding and interpretation of the data during subsequent stages.

Data Storage and Organization: The collected and processed data is stored and transmitted to a distributed storage system.

Data Security and Privacy: Ensuring the security and privacy of collected IoT data is of paramount importance within the system we have discussed. To achieve this, the following measures are implemented:

Encryption Techniques: IoT data is encrypted using robust encryption algorithms and protocols. This ensures that the data is protected from unauthorized access and remains confidential during storage, transmission, and processing. Encryption methods such as symmetric encryption, asymmetric encryption, or hybrid encryption can be employed based on the specific requirements and sensitivity of the data.

Access Control Mechanisms: Access control is implemented to manage and regulate the permissions and privileges associated with the IoT data. Role-based access control (RBAC) or attribute-based access control (ABAC) models can be used to define and enforce fine-grained access policies. This ensures that only authorized individuals or entities can access, modify, or process the data based on their defined roles or attributes.

Compliance with Data Privacy Regulations: Adherence to relevant data privacy regulations, such as the General Data Protection Regulation (GDPR) or other applicable standards, is essential. The system is designed to comply with the legal and regulatory requirements governing the collection, storage, and processing of personal and sensitive data. This includes obtaining proper consent, implementing data anonymization or pseudonymization techniques, and providing mechanisms for data subjects to exercise their privacy rights.

Secure Data Storage: The collected IoT data is securely stored using industry-standard practices. This includes employing secure storage solutions such as encrypted databases, secure file systems, or distributed storage systems with built-in data replication and redundancy. Data-at-rest encryption can be used to protect the data from unauthorized access in case of physical theft or compromise of storage devices.

Secure Data Transmission: During the transmission of IoT data, secure communication protocols such as Transport Layer Security (TLS) or Secure Shell (SSH) are utilized to establish encrypted and authenticated connections. This ensures that the data is protected from eavesdropping, tampering, or interception by unauthorized entities. Additionally, techniques like message authentication codes (MAC) or digital signatures can be employed to verify the integrity and authenticity of the transmitted data.

Data Minimization and Anonymization: To further enhance privacy, the system follows data minimization principles. Only the necessary and relevant data is collected and retained, reducing the potential risk associated with storing excessive data. Anonymization techniques, such as removing personally identifiable information or aggregating data at a group level, can be applied to further protect the privacy of individuals or entities represented in the IoT data.

Monitoring and Auditing: Robust monitoring and auditing mechanisms are implemented to track and analyze access to the IoT data. This includes logging activities, detecting anomalies or suspicious behavior, and generating alerts in case of unauthorized access attempts or data breaches. Regular audits are conducted to ensure compliance with security policies and identify potential vulnerabilities or risks.

By implementing these data security and privacy measures, the system maintains the confidentiality, integrity, and availability of the collected IoT data. It ensures that only authorized entities have access to the data, protects it from unauthorized disclosure or modifications, and complies with applicable privacy regulations to safeguard the rights and privacy of individuals or entities represented in the IoT ecosystem.

Data Integration:

Data integration plays a crucial role in the system, facilitating the seamless integration of IoT data with external data sources and other IoT devices within the Hyperledger system. This integration enables a comprehensive and holistic view of the data, considering multiple data streams and contextual factors. The following aspects are considered in the data integration process:

Data Source Identification: The system identifies relevant external data sources and IoT devices that can contribute to the overall data integration. This can include sources such as public databases, external APIs, third-party data providers, or other IoT devices within the ecosystem.

Data Acquisition and Extraction: The system employs mechanisms to acquire and extract data from the identified sources. This involves establishing connections, retrieving data through APIs or other protocols, and ensuring the compatibility and interoperability of data formats.

Data Transformation and Harmonization: Once the data is acquired from various sources, it undergoes a transformation and harmonization process. This involves mapping and aligning the data attributes, formats, and structures to ensure consistency and compatibility with the Hyperledger system. Data transformation techniques, such as data normalization, data cleaning, or data aggregation, may be applied to achieve a unified representation of the integrated data.

Data Fusion and Enrichment: The system combines the IoT data with the acquired external data sources, enabling the fusion of multiple data streams. This fusion enhances the richness and context of the data, enabling deeper insights and more comprehensive analysis. Additional data enrichment techniques, such as data enrichment with external knowledge bases or machine learning-based data augmentation, may be employed to further enhance the integrated data.

Data Storage and Management: The integrated data is stored within the Hyperledger system, ensuring secure and reliable storage. The data is organized and managed using appropriate data storage mechanisms, such as databases or distributed ledger technology, to facilitate efficient retrieval, querying, and analysis.

Data Processing and Analysis: The integrated data is subjected to data processing and analysis within the Hyperledger system. This can involve applying various analytics techniques, such as statistical analysis, machine learning, or data mining algorithms, to derive meaningful insights, patterns, or predictions from the integrated data.

Data Visualization and Reporting: The system provides capabilities for visualizing and reporting the integrated data and analysis results. This allows stakeholders to gain a clear and intuitive understanding of the integrated data and the derived insights. Visualization techniques, such as charts, graphs, or dashboards, may be utilized to present the integrated data in a user-friendly manner.

This integration enhances the comprehensiveness, accuracy, and contextuality of the data, enabling stakeholders to gain deeper insights and make informed decisions within the quantum-enabled Hyperledger system.

Data Quality Assurance: It is crucial to ensure the quality and reliability of the collected IoT data. This may involve implementing data validation techniques, anomaly detection algorithms, or data cleansing processes to identify and address any inconsistencies or errors in the data.

By following these steps, the IoT devices can effectively collect relevant data from the physical environment. This collected data serves as the foundational input for subsequent stages of the NFT-based Generative AI process, including encoding the data as NFTs, training generative AI models, and generating unique and original content.

Encode IoT Data as NFTs:

Data Representation: The collected IoT data needs to be represented in a format suitable for encoding as NFTs. This may involve transforming the data into a standardized structure or schema that captures the relevant attributes and properties of the data. The data representation should preserve the uniqueness and integrity of the information.

NFT Tokenization: The encoded IoT data is tokenized into NFTs using the Hyperledger blockchain network. The Hyperledger platform provides the necessary tools and protocols to create, manage, and interact with NFTs. Each NFT represents a unique and indivisible unit of the encoded IoT data, making it distinguishable and verifiable within the blockchain ecosystem.

Metadata and Attributes: Along with the encoded data, additional metadata and attributes are associated with each NFT. This metadata can include information such as timestamps, device identifiers, data source details, or any other relevant contextual information that provides a comprehensive understanding of the encoded IoT data.

Ownership and Transferability: The NFTs are designed to establish ownership and transferability of the encoded IoT data. Each NFT is associated with a specific owner, providing proof of ownership within the Hyperledger blockchain network. The transferability of NFTs allows the encoded IoT data to be securely transferred between different entities while maintaining a verifiable record of ownership.

NFT Creation and Ownership Assignment: The system generates NFTs for the encoded IoT data within the Hyperledger blockchain network. Each NFT is uniquely identified and associated with a specific owner, establishing the initial ownership of the encoded data.

Transfer Initiation: When an owner intends to transfer ownership of an NFT, they initiate the transfer process within the system. This can be done through a designated transfer function or smart contract specifically designed for NFT ownership transfer.

Transfer Authorization: The transfer request is validated and authorized by the system. This involves verifying the authenticity and authority of the current owner, ensuring that they have the right to initiate the transfer. The transfer request may require the owner's digital signature or other forms of authentication.

Transfer Announcement: The transfer announcement is propagated across the Hyperledger blockchain network. This notifies the network participants of the intended transfer and updates the ownership status of the NFT.

Transfer Validation: Network participants validate the transfer announcement and confirm the authenticity of the transfer request. This validation process ensures that the transfer is legitimate and complies with the rules and protocols defined within the blockchain network.

Transfer Execution: Upon successful validation, the ownership of the NFT is transferred from the current owner to the intended recipient. This transfer is recorded and permanently stored within the blockchain, providing an immutable and transparent record of the ownership transfer event.

Updated Ownership Record: The blockchain network updates the ownership record of the NFT, reflecting the new owner. This record serves as proof of ownership and provides a verifiable history of ownership transfers.

Confirmation and Finalization: The system generates a confirmation message or transaction receipt, indicating the successful transfer of ownership. Both the current owner and the recipient receive this confirmation, providing them with assurance and verifiability of the ownership transfer.

By following this step-by-step process, the system ensures the secure and authenticated transfer of ownership for NFTs representing the encoded IoT data. The public blockchain network acts as a decentralized and transparent ledger, facilitating the transfer while maintaining the integrity and traceability of ownership records.

This mechanism for NFT ownership transfer can be implemented as part of a patented system, leveraging the unique combination of quantum computing, NFTs, and the public blockchain. It enables the secure and auditable transfer of ownership rights, ensuring the integrity and protection of the encoded IoT data within the Hyperledger ecosystem.

Partial Ownership and Data Access Control: In addition to establishing ownership and transferability of the NFT-encoded IoT data, the system incorporates a data access control mechanism. This mechanism allows for partial ownership, enabling selected entities or individuals to have controlled access to the data while maintaining overall ownership rights. Generative AI models can be granted access to the NFT-encoded data based on predefined permissions or authorization rules. By implementing such access controls, the system ensures that the generative AI models can still utilize the data for training or analysis while maintaining privacy and security.

Smart Contracts Integration: Smart contracts within the Hyperledger network can be utilized to enforce rules and conditions related to the ownership, usage, and transfer of the NFTs. These smart contracts ensure the integrity and compliance of the encoded IoT data, enabling transparent and secure interactions between the participants within the blockchain network.

Verifiability and Authenticity: The NFTs and their associated encoded IoT data can be verified and authenticated using the immutability and transparency of the Hyperledger blockchain network. Any participant can independently validate the authenticity and integrity of the data represented by the NFTs, ensuring trust and reliability in the encoded IoT data.

By encoding IoT data as NFTs within the Hyperledger blockchain network, the uniqueness, verifiability, and transferability of the data are ensured. This provides a secure and transparent mechanism to represent and manage IoT data within the blockchain ecosystem, allowing for traceability, ownership verification, and secure transfer of the encoded IoT data.

Train Generative AI Models with NFT-encoded Data: The NFT-encoded IoT data is utilized to train generative AI models. These models learn patterns, correlations, and characteristics from the encoded data.

Generate Unique and Original Content: The trained generative AI models generate highly unique and original content based on the learned patterns and properties of the NFT-encoded IoT data.

Apply Quantum-inspired Algorithms: Quantum-inspired algorithms are integrated into the generative AI models to enhance the content generation process. These algorithms leverage quantum principles or techniques to explore and exploit complex relationships, adding a quantum-inspired dimension to the generated content.

Enhance Content Generation with Quantum Principles: The generative AI models utilize the integrated quantum-inspired algorithms to further enhance the content generation process. This includes leveraging quantum principles such as superposition, entanglement, and interference to introduce novel variations and characteristics into the generated content.

Verify and Validate Generated Content using NFTs: The generated content is verified and validated using the associated NFTs. The NFTs serve as proof of the authenticity and origin of the content, ensuring its integrity and trustworthiness.

The Disclosed Invention Encompasses the Following Components and Functionalities:

Quantum-enabled IoT Devices: IoT devices are equipped with quantum computing capabilities, enabling complex computations, and leveraging quantum algorithms within the IoT ecosystem. Quantum features are enabled, and connectivity with the Hyperledger network is established for secure interactions.

NFT-based Generative AI: Generative AI models are developed within the Hyperledger framework, utilizing NFTs as data sources for content generation in the IoT context. Quantum-inspired algorithms enhance the content generation process, producing highly unique and original outputs based on the properties of quantum systems.

Quantum-enabled Smart Contracts: Quantum operations and computations are integrated into smart contracts within Hyperledger, specifically designed for IoT applications. These contracts facilitate secure transactions, privacy-preserving data analysis, quantum key distribution, and quantum secure multi-party computation in the IoT domain.

IoT Integration and Communication: The invention seamlessly integrates IoT devices, Hyperledger, generative AI models, and quantum capabilities within the IoT ecosystem, allowing for efficient and secure IoT data processing, content generation, and transfer.

Public Blockchain Transfer: A public blockchain network is employed for the secure and authenticated transfer of NFT ownership among parties within the IoT ecosystem. NFTs stored on the Hyperledger network are transferred to other parties on the public blockchain, ensuring transparency, immutability, and decentralized asset exchange in the IoT domain.

Proof of Ownership: The invention establishes a robust proof of ownership mechanism for AI models using NFTs within the Hyperledger network. This enables verification, traceability, and protection of ownership rights, enhancing intellectual property protection and fostering trust among stakeholders.

Advantages and Novelty:

Enhanced Security and Authenticity: The integration of quantum algorithms, smart contracts, public blockchain transfer, and proof of ownership ensures enhanced security, authenticity, and verifiability in transactions, NFT ownership, and AI model ownership within the Hyperledger and IoT ecosystems.

Unique Content Generation: The combination of generative AI, quantum-inspired algorithms, IoT data, and NFTs enables the creation of highly unique and original content tailored for IoT applications, offering a novel and creative edge to the generated content.

Seamless IoT Integration: The invention seamlessly integrates IoT devices, Hyperledger, generative AI models, quantum capabilities, and NFT transfer within the IoT ecosystem, allowing for efficient and secure IoT data processing, content generation, and ownership transfer.

Intellectual Property Protection: The invention provides a robust proof of ownership mechanism, enhancing intellectual property protection for AI models represented by NFTs. This fosters fair licensing, monetization, collaboration, and trust among stakeholders.

Industrial Applicability

The disclosed invention finds application in diverse IoT domains, including but not limited to smart homes, industrial automation, healthcare, and environmental monitoring. By integrating quantum algorithms, NFTs, generative AI, IoT integration, public blockchain transfer, and proof of ownership within the Hyperledger framework, it enables enhanced security, authenticity, unique content generation, seamless NFT ownership transfer, and intellectual property protection.

In summary, this invention introduces a comprehensive system and method that integrates quantum algorithms into Hyperledger, leveraging NFTs as data sources for generative AI within the IoT ecosystem. The invention further incorporates the use of public blockchain networks for secure NFT transfer and establishes a robust proof of ownership mechanism for AI models. This integrated solution enables enhanced security, authenticity, unique content generation, seamless NFT ownership transfer, and intellectual property protection within the Hyperledger and IoT domains.

Figure 6:
FIG. 6 shows Quantum-inspired Adaptive layered encoding, according to an exemplary embodiment of the present invention.

FIG. 6 is described below:

Quantum-Inspired Adaptive Layered Encoding (QALE):

Quantum Superposition-based Compression: Utilize quantum principles to compress data more efficiently, adapting to device type and data characteristics; Quantum Entanglement Simulation for ML Insights: Incorporate machine learning insights using simulated quantum entanglement, creating more robust connections between data points; Quantum Bayesian Inference: Implement quantum-inspired Bayesian updates and causal inference, potentially offering more accurate probability distributions; and Dynamic Quantum NFT Generation: Generate NFTs using quantum-inspired algorithms that evolve based on incoming data.

Quantum Cryptographic Ownership and Revision Tracking (QCORT)

Quantum-Resistant Signatures: Implement post-quantum cryptographic signatures for each revision; Quantum Merkle Trees: Use quantum-resistant Merkle trees for data integrity verification; Quantum-Enhanced Audit Trail: Implement a quantum-inspired audit trail that's more resistant to tampering; and Quantum Version-Specific Verification: Utilize quantum states to represent different versions, allowing for more efficient verification.

Quantum Bayesian Integrity Verification Model (QBIVM)

Quantum Probabilistic Integrity Assessments: Use quantum probability amplitudes for more nuanced integrity assessments; Quantum Multi-factor Evaluation: Implement quantum circuits to evaluate multiple integrity factors simultaneously; Quantum Adaptive Learning: Utilize quantum machine learning techniques for faster and more effective model refinement; Quantum Confidence Intervals: Leverage quantum uncertainty principles for more accurate confidence intervals.

Blockchain Network Integration

Quantum-Inspired Adaptive Layered Encoding (QALE):

Enables efficient on-chain storage of complex IoT data by using quantum-inspired compression; Allows blockchain smart contracts to interact with and process quantum-encoded data; Facilitates dynamic NFT updates on the blockchain, reflecting real-time IoT data changes; and improves blockchain scalability by reducing data storage requirements.

Quantum Cryptographic Ownership and Revision Tracking (QCORT):

Enhances blockchain security with post-quantum cryptographic signatures for transaction validation; Improves data integrity verification on the blockchain using quantum-resistant Merkle trees; Provides a tamper-evident audit trail of NFT modifications stored immutably on the blockchain; and enables efficient verification of NFT version history across multiple blockchain states.

Quantum Bayesian Integrity Verification Model (QBIVM):

Introduces probabilistic integrity assessments for blockchain data, enhancing trust in stored information; Allows for multi-factor evaluation of data integrity within smart contracts; Implements quantum-inspired machine learning for adaptive improvement of blockchain protocols; and provides more accurate confidence intervals for blockchain oracle data.

Blockchain Integration:

Ensures cross-chain compatibility of quantum-enhanced NFTs; Enables secure transfer and verification of QEAN NFTs across different blockchain networks; Allows for quantum-inspired consensus mechanisms that can process and validate QEAN data; and Facilitates interoperability between IoT devices, quantum-enhanced data, and blockchain networks.

In certain implementations, the disclosed system and method offers several advantages, in particular, collaborative resource pooling. The system can enable multiple organizations to pool computational resources, potentially reducing overall hardware requirements and associated environmental impacts. Quantum-inspired compression allows more efficient data storage, reducing the needed physical storage infrastructure. For example, in a healthcare application: Patient data processing can be distributed across hospital systems, research institutions, and secure edge devices. Resource-intensive tasks like genomic analysis or complex health predictions could leverage the combined computational power of the network. Localized processing of sensitive data on nearby nodes could enhance response times and data privacy. The system could adaptively allocate more resources to critical health monitoring tasks during peak times without significant infrastructure changes.

The example application of the disclosed system in healthcare is described. The system can employ various IoT medical devices, such as wearable heart monitors, continuous glucose monitors, and smart inhalers for collecting patient data continuously or periodically. The baseLayer of the Quantum inspired adaptive layered encoding structure (QALE, shown in FIG. 6) timestamps and uniquely identifies each data point. The quantumDataHash provides a secure, tamper-evident hash of the data. The encodedData layer uses quantum-inspired compression algorithms to efficiently store and transmit medical data. This process significantly reduces data storage requirements while maintaining data integrity. The encoded patient data set is then minted as a unique NFT in the nftMetadata layer. The NFT includes: tokenId which is a quantum-generated unique identifier; owner who is the patient's quantum-resistant address; and responsiblePhysician which is Quantum-resistant identifier for the assigned doctor.

The quantumAdaptiveLayer applies quantum-inspired machine learning algorithms to analyze patient data trends. The quantumBayesianLayer uses simulated quantum probability distributions to update risk assessments. The quantumCausalLayer employs quantum-inspired algorithms to identify potential causal relationships in health data. The quantumLLMLayer generates natural language insights and predictions about patient health. When anomalies are detected, the system alerts the responsible physician. The quantumPhysicianInteractionLayer records all physician interactions with the patient's data NFT. This includes accessHistory: Timestamped records of when the physician accessed the data; actionsTaken: Decisions made, or treatments prescribed based on the data; and quantumSignature: The physician's quantum-resistant signature for each interaction.

The quantumAuditTrail maintains a comprehensive record of all data modifications, physician interactions, and access permissions. This trail is integral to the NFT, ensuring a complete history of patient care and medical oversight.

The quantumCrossChainCompatibility layer enables the secure sharing of anonymized health data across different healthcare institutions'blockchains. This facilitates collaborative research and seamless patient care across different healthcare providers.

The quantumSignature ensures the integrity and authenticity of the entire data structure. The quantumEntanglementProof verifies the connection between the IoT devices and the patient's data NFT.

For example, Patient John Doe has diabetes and uses a continuous glucose monitor. Here's how the AQHMS would manage his care:

Data Collection: John's glucose monitor continuously sends data to the AQHMS.

NFT Creation: The system creates an NFT for John's glucose data, with Dr. Jane Smith as the responsible physician.

Data Analysis: The quantum-inspired layers analyze John's glucose trends.

Alert Generation: The system detects an unusual pattern suggesting a risk of hypoglycemia.

Physician Notification: Dr. Smith receives an alert about John's condition.

Physician Action: Dr. Smith accesses John's data NFT, reviews the trends, and decides to adjust his insulin dosage.

\Record Keeping: The system records Dr. Smith's access, decision, and new prescription in the quantumPhysicianInteractionLayer.

Patient Notification: John receives a secure notification about the change in his treatment plan.

Continuous Monitoring: The system monitors John's response to the new treatment.

Audit Trail: All these interactions and decisions are recorded in the quantumAuditTrail within John's data NFT.

The disclosed system provides improved Patient Care by real-time monitoring and quantum-inspired analytics enable proactive healthcare management. Quantum-resistant encryption and signatures protect sensitive medical data. Quantum-inspired compression allows for efficient storage and transmission of large volumes of medical data. The integrated audit trail provides clear accountabilities for all medical decisions and actions. Anonymized data sharing across institutions accelerates medical research. Cross-chain compatibility ensures seamless data transfer between healthcare systems. Despite comprehensive data collection and analysis, patient privacy is maintained through advanced encryption and access controls. Efficient data processing and storage contribute to a more sustainable healthcare IT infrastructure.

Referring to FIG. 1 which is a block diagram illustrating the architecture of the disclosed system 100. The system includes a processor 110, a memory 120, and IoT devices 130. The processor can be any logic circuitry that responds to, and processes instructions fetched from the memory. The memory may include one or more memory chips capable of storing data and allowing any storage location to be directly accessed by the processor. The memory includes modules according to the present invention for execution by the processor to perform one or more steps of the disclosed methodology. For example, the memory may include a Gen-AI model 140, Encoded IoT data 150, NFTs 160, Hyperledger framework 170, and quantum-inspired algorithms 180, wherein these upon execution by the processor perform one or more steps of the disclosed invention. The system can be implemented on one or more servers, wherein these servers can be geographically dispersed and include cloud servers.

Figure 2:
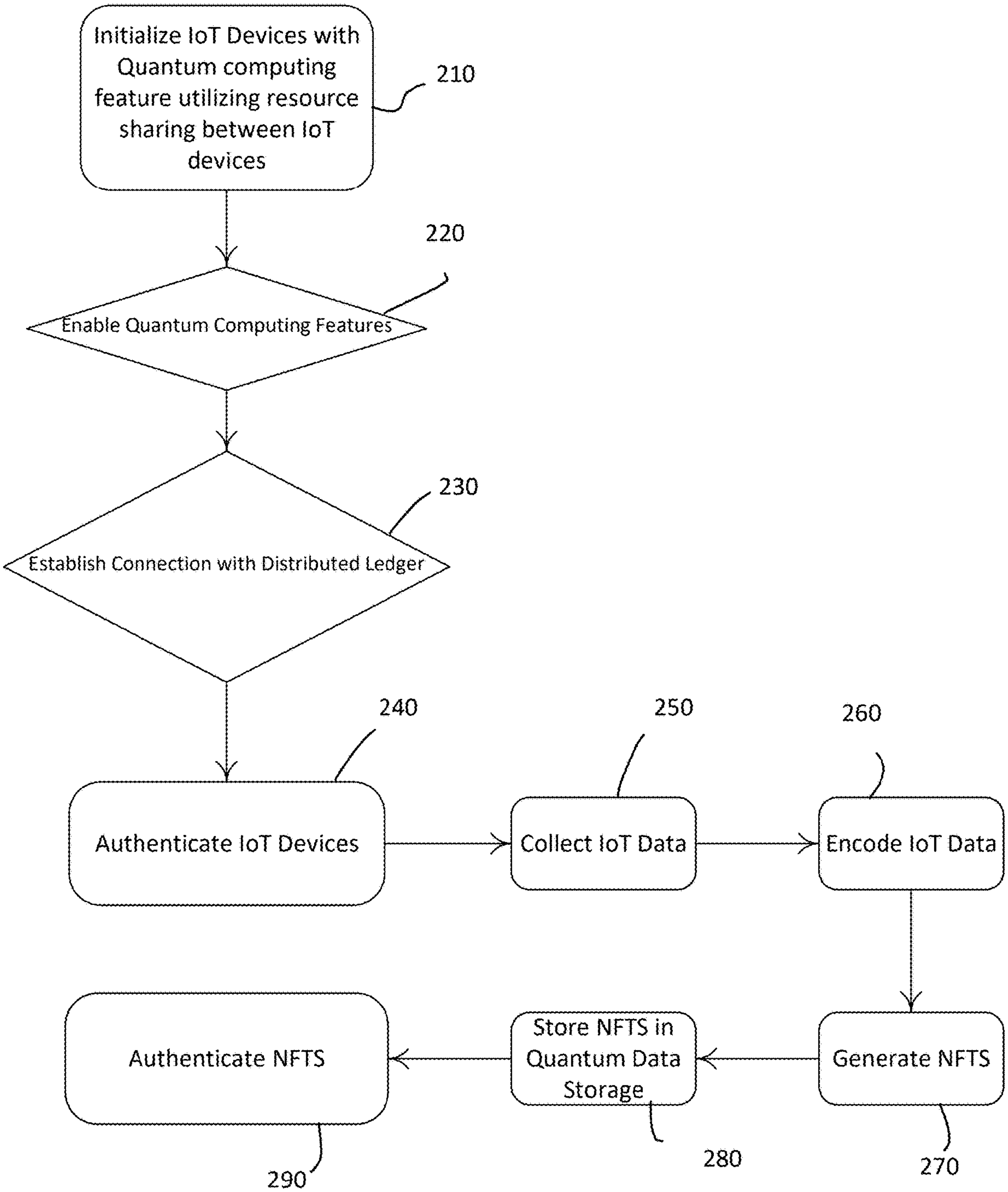
FIG. 2 is a flowchart illustrating a system flow diagram, according to an exemplary embodiment of the present invention.

Referring to FIG. 2 which provided an overview of the method performed by system 100. First, the IoT Devices with Quantum computing features utilizing resource sharing between IoT devices can be initialized, at step 210. Enabling Quantum Computing Features, at step 220. Establishing a connection with Distributed Ledger, at step 230. Authenticating the IoT Devices, at step 240. Collecting IoT data, at step 250. Encoding IoT data, at step 260. Generating NFTs, at step 270. Storing the NFTs in quantum data storage, at step 280, and authenticating the NFTs stored in the database, at step 290.

Figure 4:
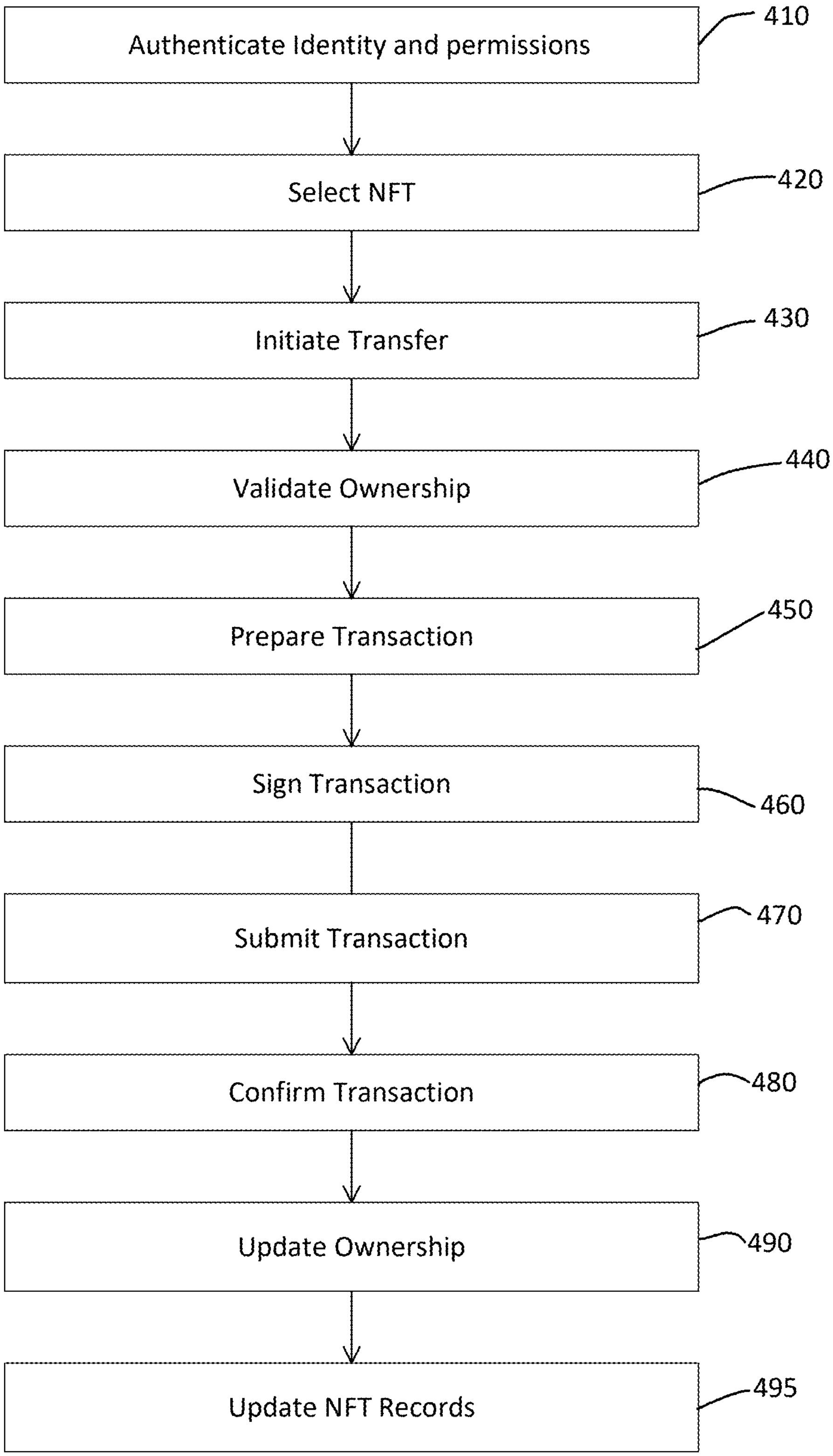
FIG. 4 Illustrates the flow of IoT data to NFT Creation, according to an exemplary embodiment of the present invention.

Refer to FIG. 4 which Illustrates the flow of IoT data to NFT Creation. First, authenticating Identity and Permissions, at step 410; selecting NFTs, at step 420; initiating the transfer, at step 430; validating the ownership, at step 440; preparing the transaction, at step 450; signing the transaction, at step 460; submitting the transaction, at step 470; confirming the transaction, at step 480; updating ownership, at step 490; and updating NFT Records, at step 495.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system for leveraging quantum computing, NFT-based generative AI, and public blockchain technology to enhance security, authenticity, content generation, and ownership transfer within an Internet of Things (IoT) environment, the system comprising a processor and a memory, the system configured to implement a method comprising:

receiving IoT data from a plurality of IoT devices, wherein the plurality of IoT devices are quantum-enabled, wherein the plurality of IoT devices are equipped with quantum computing capabilities and leverages quantum algorithms;

encoding the IoT data to encoded IoT data for creating non-fungible tokens (NFTs), wherein encoding comprises adding schemas and metadata, the schema is configured to capture attributes and properties of the IoT data, the metadata comprises timestamps, device identifiers, data, and source details; and tokenizing the encoded IoT data into the NFTs on a Hyperledger blockchain network, wherein each NFT represents a unique and indivisible unit of the encoded IoT data, making it distinguishable and verifiable within a blockchain ecosystem.

2. The system of claim 1, wherein the NFTs are stored in the Hyperledger blockchain network within the IoT environment for transferring using a public blockchain.

3. The system of claim 1, wherein the method further comprises implementing network infrastructure and protocols that facilitate distribution and coordination of quantum computing tasks among the plurality of IoT devices enabling collaboration and efficient utilization of quantum computing resources.

4. The system of claim 3, wherein the method further comprises:

establishing a Hyperledger Fabric network, wherein the plurality of IoT devices are configured to act as peers in the Hyperledger Fabric network.

5. The system of claim 4, wherein the method further comprises:

dividing a quantum computation task into a plurality of sub-tasks;

receiving a transaction proposal from each IoT device of the plurality of IoT devices, wherein the transaction proposal comprises a sub-task that can be executed by the respective IoT device and required data input;

assigning the plurality of sub-tasks to the plurality of IoT devices for processing in parallel, wherein computational tasks, data inputs, and instructions for each IoT device are in a form of a smart contract implemented as a chain code in the Hyperledger Fabric network, wherein assigning is based on an IoT device's capabilities, availability, and computational load to optimize resource utilization; and upon execution of the plurality of sub-tasks by the plurality of IoT devices, aggregation of results through a consensus mechanism obtaining aggregated results.

6. The system of claim 5, wherein the method further comprises:

upon validating the aggregated results, recording the aggregated results in a blockchain database.

7. The system of claim 5, wherein the method further comprises:

sharing of data between the plurality of IoT devices during execution of the plurality of sub-tasks for collaborative processing, wherein the data comprises intermediate results and data inputs.

8. The system of claim 2, wherein the method further comprises:

transferring the IoT data on the public blockchain as NFTs, wherein each NFT comprises unique identifiers, cryptographic signatures, and ownership information.

9. The system of claim 5, wherein the method further comprises:

training a Generative artificial intelligence model using NFT encoded IoT data, wherein the Generative artificial intelligence (Gen AI) model is for creating content for IoT applications, wherein the Gen AI model leverages quantum-inspired algorithms to enhance content generation process based on properties of quantum systems.

10. The system of claim 1, wherein the plurality of IoT devices comprises ARM architecture-based devices.

11. A method for leveraging quantum computing, NFT-based generative AI, and public blockchain technology to enhance security, authenticity, content generation, and ownership transfer within an Internet of Things (IoT) environment, the method implemented within a system comprising a processor and a memory, the method comprising:

receiving IoT data from a plurality of IoT devices, wherein the plurality of IoT devices are quantum-enabled, wherein the plurality of IoT devices are equipped with quantum computing capabilities and leverages quantum algorithms;

encoding the IoT data to encoded IoT data for creating non-fungible tokens (NFTs), wherein encoding comprises adding schemas and metadata, the schema is configured to capture attributes and properties of the IoT data, the metadata comprises timestamps, device identifiers, data, and source details; and tokenizing the encoded IoT data into the NFTs on a Hyperledger blockchain network, wherein each NFT represents a unique and indivisible unit of the encoded IoT data, making it distinguishable and verifiable within a blockchain ecosystem.

12. The method of claim 11, wherein the NFTs are stored in the Hyperledger blockchain network within the IoT environment for transferring using a public blockchain.

13. The method of claim 11, wherein the method further comprises implementing network infrastructure and protocols that facilitate distribution and coordination of quantum computing tasks among the plurality of IoT devices enabling collaboration and efficient utilization of quantum computing resources.

14. The method of claim 13, wherein the method further comprises:

establishing a Hyperledger Fabric network, wherein the plurality of IoT devices are configured to act as peers in the Hyperledger Fabric network.

15. The method of claim 14, wherein the method further comprises:

dividing a quantum computation task into a plurality of sub-tasks;

receiving a transaction proposal from each IoT device of the plurality of IoT devices, wherein the transaction proposal comprises a sub-task that can be executed by the respective IoT device and required data input;

assigning the plurality of sub-tasks to the plurality of IoT devices for processing in parallel, wherein computational tasks, data inputs, and instructions for each IoT device are in a form of a smart contract implemented as a chain code in the Hyperledger Fabric network, wherein assigning is based on an IoT device's capabilities, availability, and computational load to optimize resource utilization; and upon execution of the plurality of sub-tasks by the plurality of IoT devices, aggregation of results through a consensus mechanism obtaining aggregated results.

16. The method of claim 15, wherein the method further comprises:

upon validating the aggregated results, recording the aggregated results in a blockchain database.

17. The method of claim 15, wherein the method further comprises:

sharing of data between the plurality of IoT devices during execution of the plurality of sub-tasks for collaborative processing, wherein the data comprises intermediate results and data inputs.

18. The method of claim 12, wherein the method further comprises:

transferring the IoT data on the public blockchain as NFTs, wherein each NFT comprises unique identifiers, cryptographic signatures, and ownership information.

19. The method of claim 15, wherein the method further comprises:

training a Generative artificial intelligence model using NFT encoded IoT data, wherein the Generative artificial intelligence (Gen AI) model is for creating content for IoT applications, wherein the Gen AI model leverages quantum-inspired algorithms to enhance content generation process based on properties of quantum systems.

20. The method of claim 11, wherein the plurality of IoT devices comprises ARM architecture-based devices.

* * * * *